(12) United States Patent
Cook et al.

(10) Patent No.: US 10,053,871 B2
(45) Date of Patent: Aug. 21, 2018

(54) UNBONDED LOOSEFILL INSULATION

(71) Applicant: Owens Corning Intellectual Capital, LLC, Toledo, OH (US)

(72) Inventors: David Michael Cook, Granville, OH (US); Michael Eugene Evans, Granville, OH (US); Stephen Phillips, Nephi, UT (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 15/427,096

(22) Filed: Feb. 8, 2017

(65) Prior Publication Data

US 2017/0226755 A1 Aug. 10, 2017

Related U.S. Application Data

(60) Provisional application No. 62/292,492, filed on Feb. 8, 2016.

(51) Int. Cl.
| | | |
|---|---|---|
| *E04F 21/08* | (2006.01) | |
| *C03C 3/076* | (2006.01) | |
| *C03C 13/06* | (2006.01) | |
| *E04B 1/76* | (2006.01) | |

(52) U.S. Cl.
CPC ............ *E04F 21/085* (2013.01); *C03C 3/076* (2013.01); *C03C 13/06* (2013.01); *E04B 1/7604* (2013.01)

(58) Field of Classification Search
CPC ... C03C 3/45; C03C 3/076; C03C 3/06; E04F 21/085
See application file for complete search history.

(56) References Cited

U.S. PATENT DOCUMENTS

| | | | |
|---|---|---|---|
| 5,551,212 A | 9/1996 | Odenthal | |
| 5,932,499 A | 8/1999 | Xu et al. | |
| 5,947,646 A | 9/1999 | Lytle | |
| 6,012,263 A * | 1/2000 | Church | B05B 7/1409 156/71 |
| 6,047,518 A | 4/2000 | Lytle | |
| 6,383,623 B1 | 5/2002 | Erb, Jr. | |
| 6,562,257 B1 | 5/2003 | Chen et al. | |
| 7,449,125 B2 | 11/2008 | Church et al. | |
| 7,608,159 B2 | 10/2009 | Fellinger et al. | |
| 7,770,691 B2 | 8/2010 | Schabel, Jr. | |
| 8,322,111 B2 | 12/2012 | Near et al. | |
| 8,536,079 B2 | 9/2013 | Evans et al. | |
| 8,793,952 B2 | 8/2014 | Olang | |
| 8,794,554 B2 | 8/2014 | Evans | |
| 2004/0059027 A1 | 3/2004 | Steffonson | |
| 2005/0014896 A1 | 1/2005 | Schmidt et al. | |

(Continued)

FOREIGN PATENT DOCUMENTS

| | | |
|---|---|---|
| WO | 2012/072971 | 6/2012 |
| WO | 2013/076601 | 5/2013 |

*Primary Examiner* — Paola Agudelo
(74) *Attorney, Agent, or Firm* — Calfee, Halter & Griswold LLP (57) ABSTRACT

A loosefill insulation installation has an insulation space, and insulation material in the insulation space. The loosefill insulation material is made from fiberglass fibers. A thermal resistance (R) per inch of installed loosefill insulation material is between 3.1 and 3.9 R per inch. The average density of the installed loosefill insulation material is between 0.6 and 1.0 pounds per cubic foot.

9 Claims, 9 Drawing Sheets

(56) References Cited

U.S. PATENT DOCUMENTS

| | | | |
|---|---|---|---|
| 2006/0000155 A1* | 1/2006 | Wagner | E04B 31/7604 52/22 |
| 2006/0148634 A1* | 7/2006 | Guter | C03C 3/091 501/36 |
| 2006/0150575 A1 | 7/2006 | Bowman et al. | |
| 2006/0165885 A1* | 7/2006 | Fay | E04B 31/7604 427/206 |
| 2006/0254208 A1* | 11/2006 | Clark | E04C 2/36 52/794.1 |
| 2006/0257639 A1* | 11/2006 | Bianchi | E04B 31/7604 428/292.1 |
| 2007/0063080 A1* | 3/2007 | Evans | B02C 18/2216 241/73 |
| 2008/0020206 A1* | 1/2008 | Fay | E04B 31/7604 428/375 |
| 2008/0121836 A1 | 5/2008 | Bowman et al. | |
| 2009/0094908 A1 | 4/2009 | Krueger et al. | |
| 2009/0107064 A1 | 4/2009 | Bowman | |
| 2009/0107068 A1 | 4/2009 | Fay et al. | |
| 2009/0107072 A1 | 4/2009 | Bowman et al. | |
| 2009/0107079 A1 | 4/2009 | Bowman et al. | |
| 2010/0319275 A1* | 12/2010 | O'Leary | E04B 1/7604 52/173.1 |
| 2011/0069498 A1* | 3/2011 | Alter | E04B 9/006 362/364 |
| 2014/0339457 A1 | 11/2014 | Evans et al. | |
| 2015/0218803 A1* | 8/2015 | Rockwell | E04D 13/1637 52/404.2 |
| 2015/0283577 A1* | 10/2015 | Zhang | B05B 7/00 427/181 |
| 2015/0330612 A1* | 11/2015 | Zich | F21V 29/85 362/147 |
| 2017/0051502 A1 | 2/2017 | Wolf et al. | |
| 2017/0226755 A1* | 8/2017 | Cook | C03C 3/076 |

* cited by examiner

UNBONDED LOOSEFILL INSULATION

RELATED APPLICATIONS

The present application claims priority to and any other benefit of U.S. Provisional Patent Application No. 62/292,492, titled "Unbonded Loosefill Insulation", filed on Feb. 8, 2016, the entire disclosure of which is incorporated herein by reference in its entirety.

BACKGROUND

In the insulation of buildings, a frequently used insulation product is unbonded loosefill insulation material. In contrast to the unitary or monolithic structure of insulation batts or blankets, unbonded loosefill insulation material is a multiplicity of discrete, individual tufts, cubes, flakes or nodules. Unbonded loosefill insulation material can be applied to buildings by blowing the loosefill insulation material into insulation cavities, such as sidewall cavities, floor cavities, ceiling cavities, or an attic of a building (vented or unvented). Examples of unvented attics are disclosed by U.S. patent application Ser. No. 15/224,870, titled Roofing Insulation Systems, filed on Aug. 1, 2016, which is incorporated herein by reference in its entirety. The loosefill insulation described by the present application can be installed in any of the attics disclosed by U.S. provisional patent application Ser. No. 15/224,870. Typically unbonded loosefill insulation is made of glass fibers although other mineral fibers, organic fibers, and cellulose fibers can be used.

Unbonded loosefill insulation material is typically compressed and packaged in a bag. The bags of compressed unbonded loosefill insulation are transported from an insulation manufacturing site to a building that is to be insulated. The compressed unbonded loosefill insulation can be packaged with a compression ratio of at least about 10:1. The distribution of unbonded loosefill insulation into an insulation cavity typically uses a loosefill blowing machine that feeds the unbonded loosefill insulation pneumatically through a distribution hose. Loosefill blowing machines can have a chute or hopper for containing and feeding the compressed unbonded loosefill insulation after the package is opened and the compressed unbonded loosefill insulation is allowed to expand.

SUMMARY

A loosefill insulation installation has an insulation space, and insulation material in the insulation space. The loosefill insulation material is made from fiberglass fibers. A thermal resistance (R) per inch of installed loosefill insulation material is between 3.1 and 3.9 R per inch. The average density of the installed loosefill insulation material is between 0.6 and 1.0 pounds per cubic foot.

DETAILED DESCRIPTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Numerical ranges set forth in the specification are meant to disclose not only the range stated, but also all subranges and numerical values within the stated numerical range. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

The description and figures disclose an unbonded loosefill insulation installation (herein "loosefill installation"). A loosefill installation comprises loosefill insulation material (hereafter "loosefill material") formed from mineral fibers that is provided between a ceiling and a floor of a multi-story building or in a wall at an average thickness T and at an average density. The terms "unbonded loosefill insulation material" or "loosefill material", as used herein, is defined to mean any conditioned insulation material configured for distribution, typically in an airstream. The term "unbonded", as used herein, is defined to mean the absence of a binder. The term "conditioned", as used herein, is defined to mean the separating and/or shredding of the loosefill material to a desired density prior to distribution in an airstream. The term "R value", as used herein, is defined to mean a measure of thermal resistance and is usually expressed as ft$^2 \cdot$ °F·h/Btu.

Figure 1:
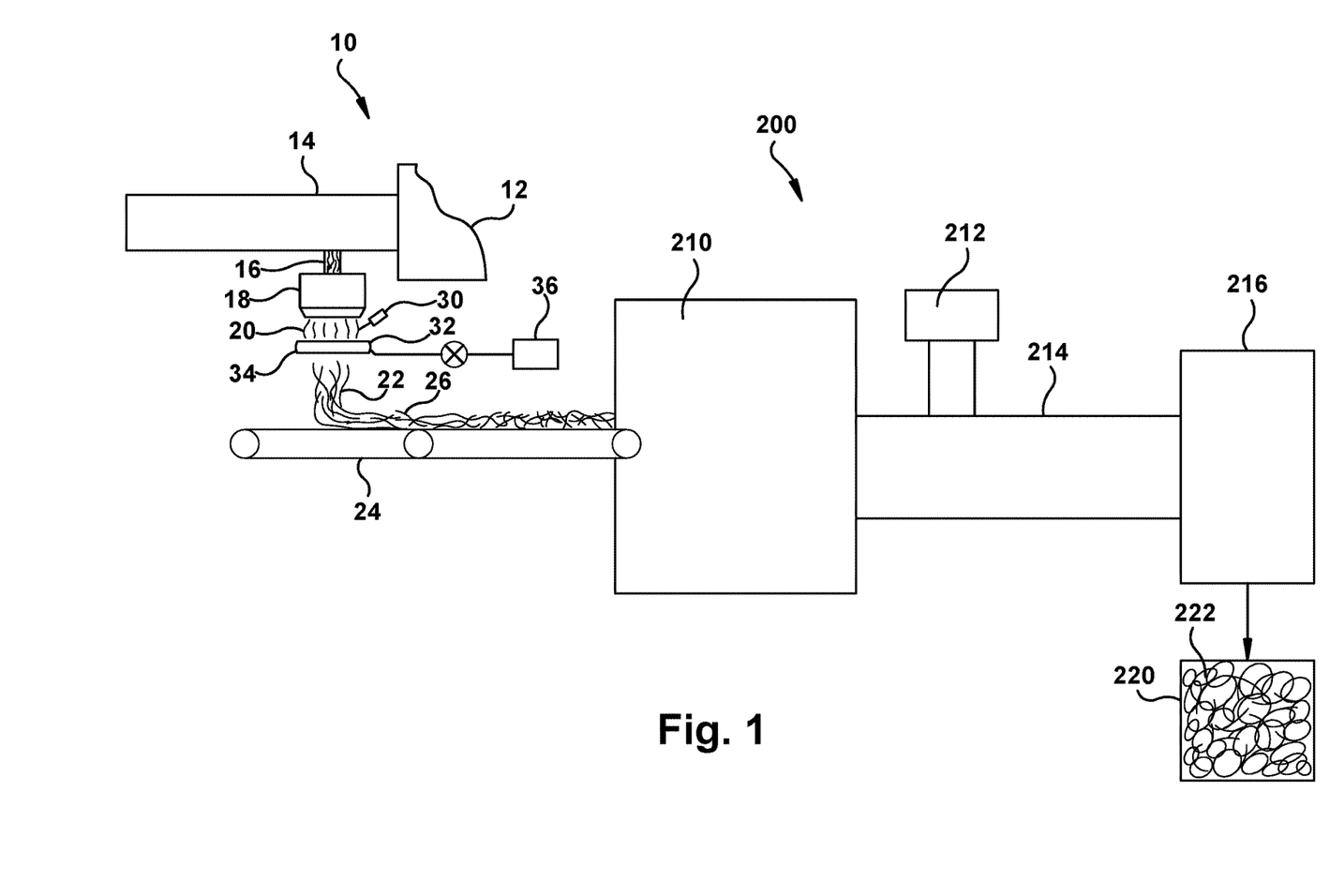
FIG. 1 is a schematic illustration of an apparatus for making and packaging unbonded loosefill insulation.

Referring now to FIG. 1, one non-limiting example of a process for manufacturing mineral fibers for use as loosefill material is shown generally at 10. A portion of FIG. 1 is a portion of FIG. 1 of published US Patent Application Pub. No. 2014/0339457, which is incorporated herein by reference in its entirety. For purposes of clarity, the manufacturing process 10 will be described in terms of glass fiber manufacturing, but the manufacturing process 10 is applicable as well to the manufacture of fibrous products of other mineral materials, such as the non-limiting examples of rock, slag and basalt.

Referring again to FIG. 1, molten glass 16 is supplied from a forehearth 14 of a furnace 12 to rotary fiberizers 18. The molten glass 16 can be formed from various raw materials combined in such proportions as to give the desired chemical composition. This proportion is termed the glass batch. The composition of the glass batch and the glass manufactured from it are commonly expressed in terms of percentages of the components expressed as oxides; typically $SiO_2$, $Al_2O_3$, CaO, MgO, $B_2O_3$, $Na_2O$, $K_2O$, $Fe_2O_3$ and minor amounts of other oxides. The glass composition controls various properties of the glass batch and the manufactured glass fibers including the non-limiting examples of viscosity, liquidus temperature, durability, thermal conductivity and biosolubility.

The fiberizers 18 receive the molten glass 16 and subsequently form veils 20 of glass fibers 22 and hot gases. The flow of hot gases can be created by optional blowing mechanisms, such as the non-limiting examples of an annular blower (not shown) or an annular burner (not shown), configured to direct the glass fibers 22 in a given direction, usually in a downward manner.

The veils 20 are gathered and transported to downstream processing stations. While the embodiment illustrated in FIG. 1 shows a quantity of one fiberizer 18, it should be appreciated that any desired number of fiberizers 18 can be used. In one embodiment, the glass fibers 22 are gathered on a conveyor 24 such as to form a blanket or batt 26.

Referring again to FIG. 1, spraying mechanisms 30 can be configured to spray fine droplets of water onto the hot gases in the veils 20 to help cool the flow of hot gases. The spraying mechanisms 30 can be any desired structure, mechanism or device sufficient to spray fine droplets of water onto the hot gases in the veils 20 to help cool the flow of hot gases.

In the manufacture of fibrous blankets or batts 26, it is known to design the glass composition to optimize the infrared radiation absorption and thus decrease the thermal conductivity (k) of the resulting glass product. The thermal conductivity (k) of the resulting blankets or batts 26 is a measure of the amount of heat, in BTUs used per hour, which will be transmitted through one square foot of material that is one inch thick to cause a temperature change of one degree Fahrenheit from one side of the material to the other side of the material. The SI unit for thermal conductivity (k) is watts/meter/Kelvin. The lower the thermal conductivity (k) for a material, the better it insulates. The thermal conductivity (k) for a fibrous material is dependent upon a number of variables including density of the fibers, fiber diameter, uniformity of the fiber distribution and composition of the glass. Increased pack density and reduced fiber diameter generally lead to lower thermal conductivities (k). One example of a disclosure for the composition of a glass batch for batts is U.S. Pat. No. 5,932,499 (issued Aug. 3, 1999 to Xu et al.), which is incorporated herein by reference in its entirety. ASTM Standard C 518 can be used as a test method for steady-state thermal transmission properties with a heat flow meter apparatus and is incorporated herein by reference in its entirety. ASTM Standard C 687 can be used as a test method for determining thermal resistance of loose-fill building insulation and is incorporated herein by reference in its entirety. ASTM Standard C 764 can be used to specify mineral fiber loose-fill thermal insulation and is incorporated herein by reference in its entirety. ASTM Standard C 1374 can be used as a test method for determining the installed thickness of pneumatically applied loose-fill building insulation and is incorporated herein by reference in its entirety. ASTM Standard C 1574 is a guide for determining blown density of pneumatically applied loose-fill mineral fiber thermal insulation and is incorporated herein by reference in its entirety.

Chemistry, such as an emulsified silicone, may be applied to the glass fibers after the glass fibers are formed and before the glass fibers are gathered on the conveyor 24. This chemistry may be applied with the cooling water, or downstream of the cooling water. In the illustrated embodiment, a series of nozzles 32 are positioned in a ring 34 around the veil 20 at a position below the fiberizers 18. The nozzles 32 are configured to supply the emulsified silicone to the glass fibers 22 from a source 36. The emulsified silicone is configured to prevent damage to the glass fibers 22 as the glass fibers 22 move through the manufacturing process 10 and come into contact with various apparatus components as well as other glass fibers 22, as well as, preventing damage to the glass fibers when the loosefill insulation material is installed to form the loosefill insulation installation. The application of the chemistry is controlled by a valve 38 such that the amount of chemistry, such as emulsified silicone, being applied can be precisely controlled. The chemistry can be a silicone compound. However, the chemistry can also be other materials, combinations of materials, or combinations of other materials with silicone.

The batt 26 is transported by the conveyor 24 to a loosefill forming device 200, such as a mill 210, transport fan 212, and ductwork 214. The mill 210 can take a wide variety of different forms. The mill 210 may include rotary hammers, cutting screens, shape cutters, such as cube cutters and the like. The mill 210 disassembles the blanket 26 into tufts of loosefill material. Operation of the mill 210 can be adjusted to perform product morphology and density adjustments (large vs. small 'nodules' of loosefill). In one exemplary embodiment, the disassembled blanket is pulled out of the mill 210 via the transport fan 212 through long duct work 214, which terminates at the baggers 216. The transport fan 212 dictates the dwell time of the fiberglass in the mill 210, and can be adjusted to adjust the density of the loosefill insulation material.

As discussed above, the tufts of glass fibers 22 and hot gases can be collected by the ductwork 212. The ductwork is shaped and sized to receive the tufts of glass fibers 22 and hot gases. The ductwork 212 is configured to transfer the glass fibers 22 and/or hot gases to or more processing stations for further handling. The ductwork 212 can be any generally hollow pipe members that are suitable for receiving and conveying the tufts of glass fibers 22 and hot gases.

Optionally, the glass fibers 22 can be coated with additional chemistry downstream of the mill 210. For example, the glass fibers 22 can be coated with additional chemistry in the ductwork 214, between mill 210 and the ductwork 214, and/or between the ductwork 214 and the bagger 216. Examples of chemistry that can be applied downstream of the mill includes, but is not limited to, reactive silicone, anti-static treatment, pigment, and mineral oil.

Referring again to FIG. 1 it should be noted that the manufacturing process 10 is being used to form loosefill material, a binder material is not applied to the glass fibers 22. However, it should be appreciated that insignificant amounts of binder could be applied to the fibers 22 as desired depending on the specific application and design requirements of the resulting loosefill material. In another exemplary embodiment, a binder can be applied to the glass fibers. The application of the binder to the glass fibers results in the shape of tufts or pieces of the loosefill insulation material to be better defined. A wide variety of different materials can be used. Any known binder used to make loosefill insulation tufts or insulation batts can be used.

In one exemplary embodiment, the ductwork 212 transfers the tufts 220 of fiberglass fibers 22 to downstream baggers 216 that compress the tufts 220 of glass fibers 22 into bags or packages of compressed loosefill material. The bags or packages of compressed loosefill material are ready for transport from an insulation manufacturing site to a building that is to be insulated. The bags can be made of polypropylene or other suitable material. During the packaging of the loosefill material, it is placed under compression for storage and transportation efficiencies. Typically, the loosefill material is packaged with a compression ratio of at least about 10:1.

The distribution of the loosefill material 222 to form an insulation installation typically uses an insulation blowing machine 310 that conditions the loosefill material and feeds the conditioned loosefill material pneumatically through a distribution hose 346. In an exemplary embodiment, a package 220 (see FIG. 1) of compressed unbonded loose fill material 222 is opened and fed into a hopper 314 of a blowing machine 310. In an exemplary embodiment, the blowing machine 310 has a set of paddles to open up the compressed material 222 and a fan blows the loosefill material through a long hose 346 to the point of installation.

Figure 2:
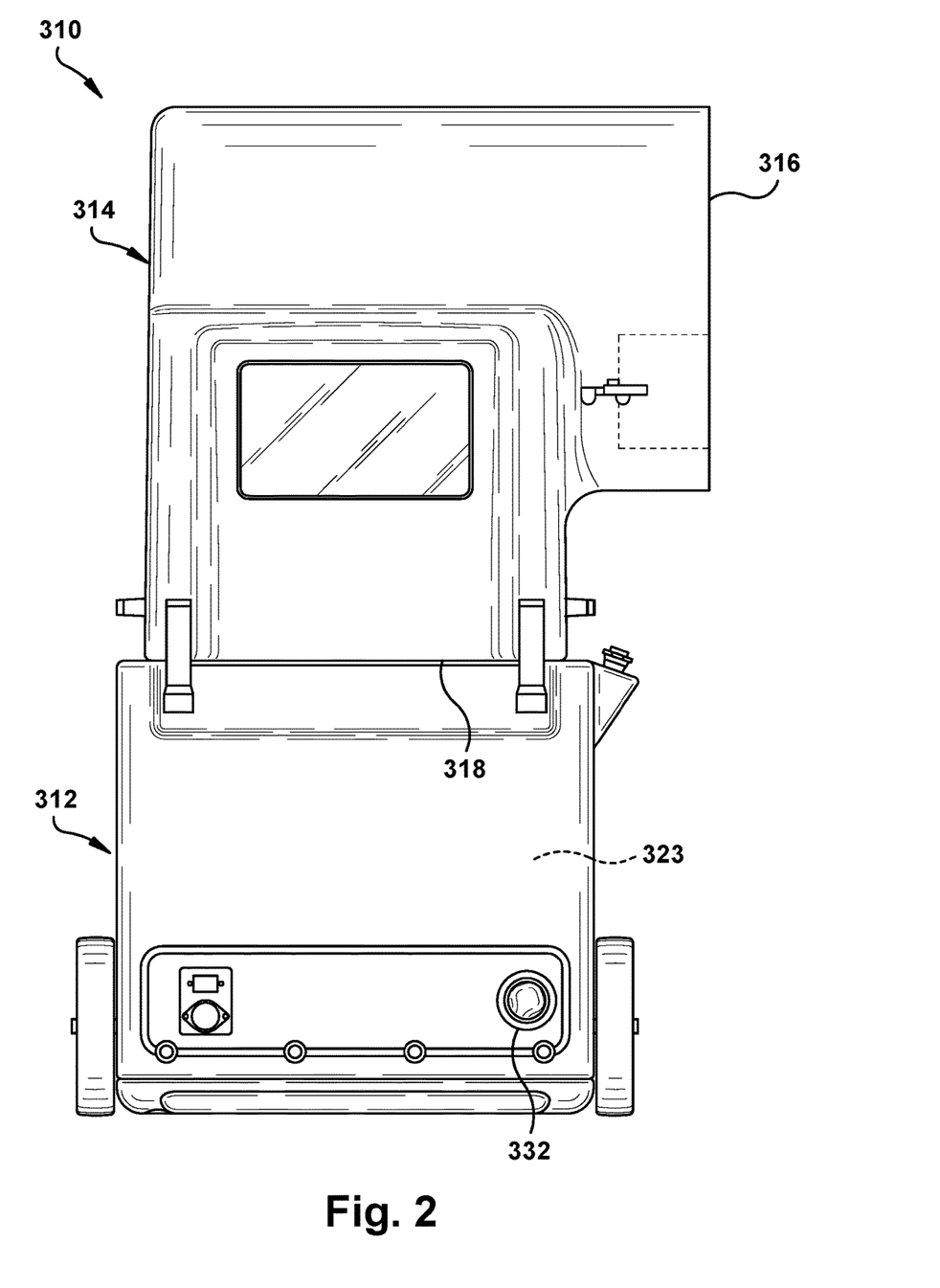
FIG. 2 is a rear view of a machine for installing unbonded loosefill insulation.
Figure 3:
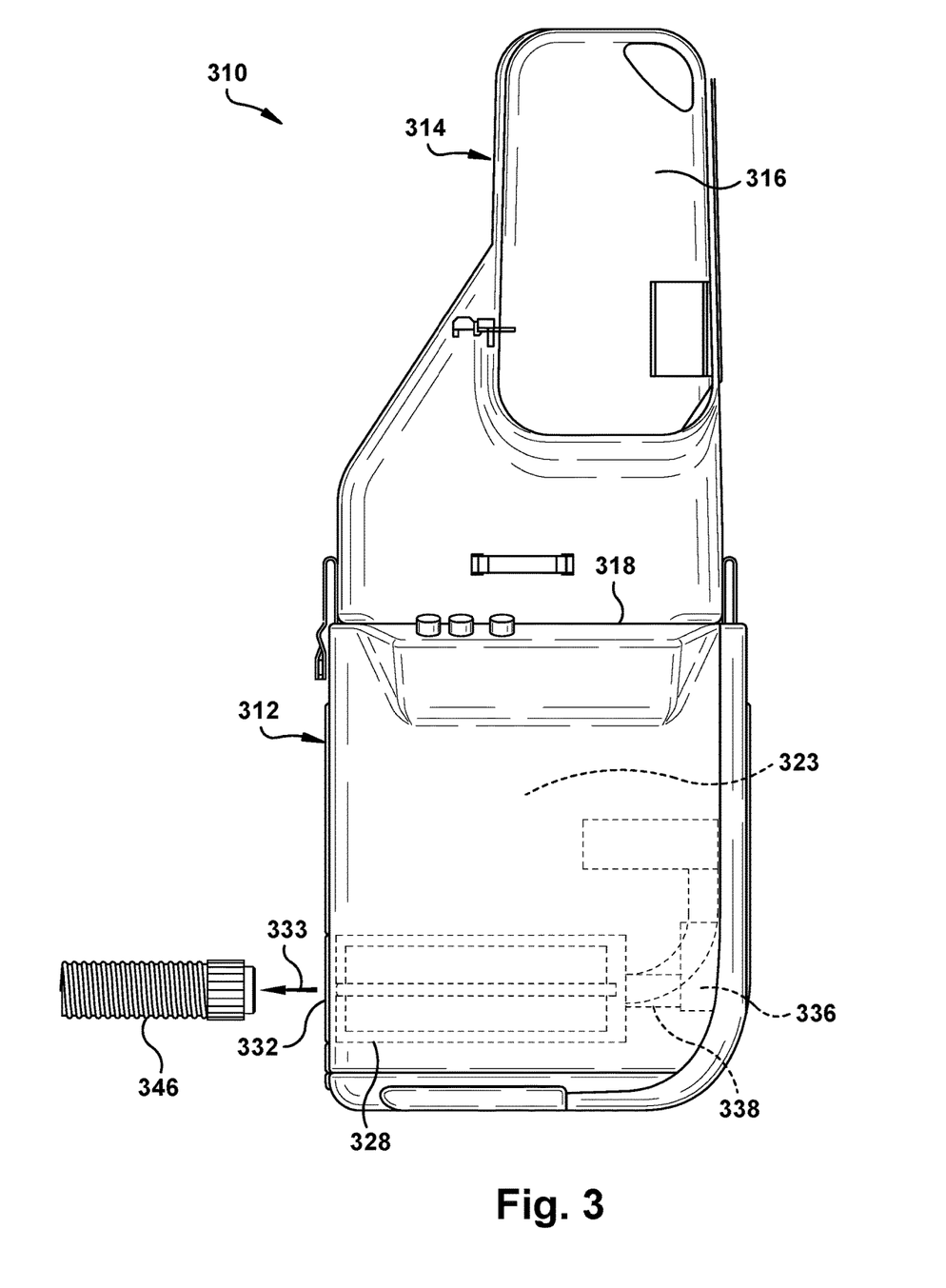
FIG. 3 is a side view of the machine for installing unbonded loosefill insulation illustrated by FIG. 2.

Referring to FIGS. 2 and 3, one example of a loosefill blowing machine, configured for distributing compressed unbonded loosefill insulation material is disclosed by U.S. Pat. No. 8,794,554 (herein "the '554 Patent"), which is incorporated herein by reference in its entirety. However, a wide variety of different loosefill blowing machines can be used. For example, other loosefill blowing machines may be available from Owens Corning, CertainTeed, Knauf, and Johns Manville. In one exemplary embodiment, the blowing machine is a truck mounted machine that is owned and/or operated by a contractor in the business of installing loosefill insulation.

Insulation blowing machines typically have a chute or hopper 314 for containing and feeding the loosefill material 222 after the package 220 is opened and the compressed loosefill material is allowed to expand. This loosefill blowing machine 310 of the '554 Patent includes a lower unit 312 and a chute 314. The chute 314 has an inlet end 316 and an outlet end 318. The chute 314 is configured to receive loosefill material and introduce the loosefill material to a shredding chamber 323.

The shredding chamber 323 is mounted at the outlet end 318 of the chute 314. The shredding chamber includes shredders and/or an agitator that are configured to shred and pick apart the loosefill material as the loosefill material is discharged from the outlet end 318 of the chute 314 into the lower unit 312. The resulting loosefill insulation material conditioned for distribution into an airstream. A discharge mechanism 328 (see FIG. 3) is positioned adjacent to distribute the conditioned loosefill material in an airstream. In this embodiment, the conditioned loosefill material is driven through the discharge mechanism 328 and through a machine outlet 332 by an airstream provided by a blower 336 mounted in the lower unit 312. The airstream is indicated by an arrow 333. In the illustrated embodiment, the blower 336 provides the airstream 333 to the discharge mechanism 328 through a duct 338, from the blower 336 to the discharge mechanism 328.

The finely conditioned loosefill material enters the discharge mechanism 328 for distribution into the airstream 333 caused by the blower 336. The airstream 333, with the finely conditioned loosefill material, exits the machine 310 at a machine outlet 332 and flows through a distribution hose 346, toward the location of the installation.

The present application provides examples of loosefill insulation installation between mid-floors of multi-story buildings. However, the concepts disclosed by the present application can be implemented in a wide variety of insulation installations. For example, the loosefill insulation and loosefill insulation installations described by the present patent application can be used in any application where insulation is netted and blown or used to fill a space constrained cavity. These applications include, but are not limited to, an unvented pitched roof assembly, a commercial flat roof assembly, netted and blown walls.

Figure 4:
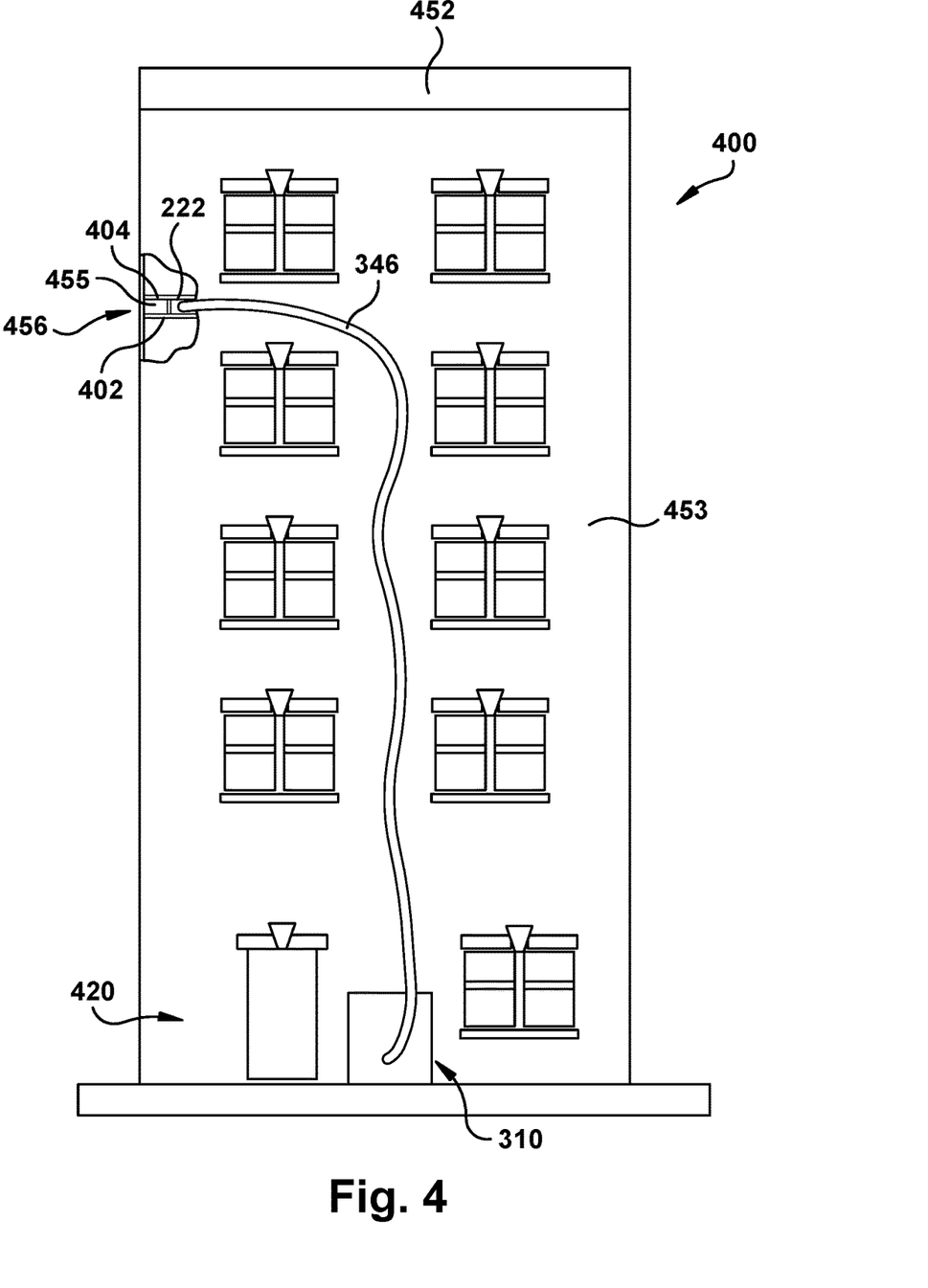
FIG. 4 is an illustration of an example of a multi-story building having insulation cavities between the ceiling of one story and the floor of the next story.
Figure 5:
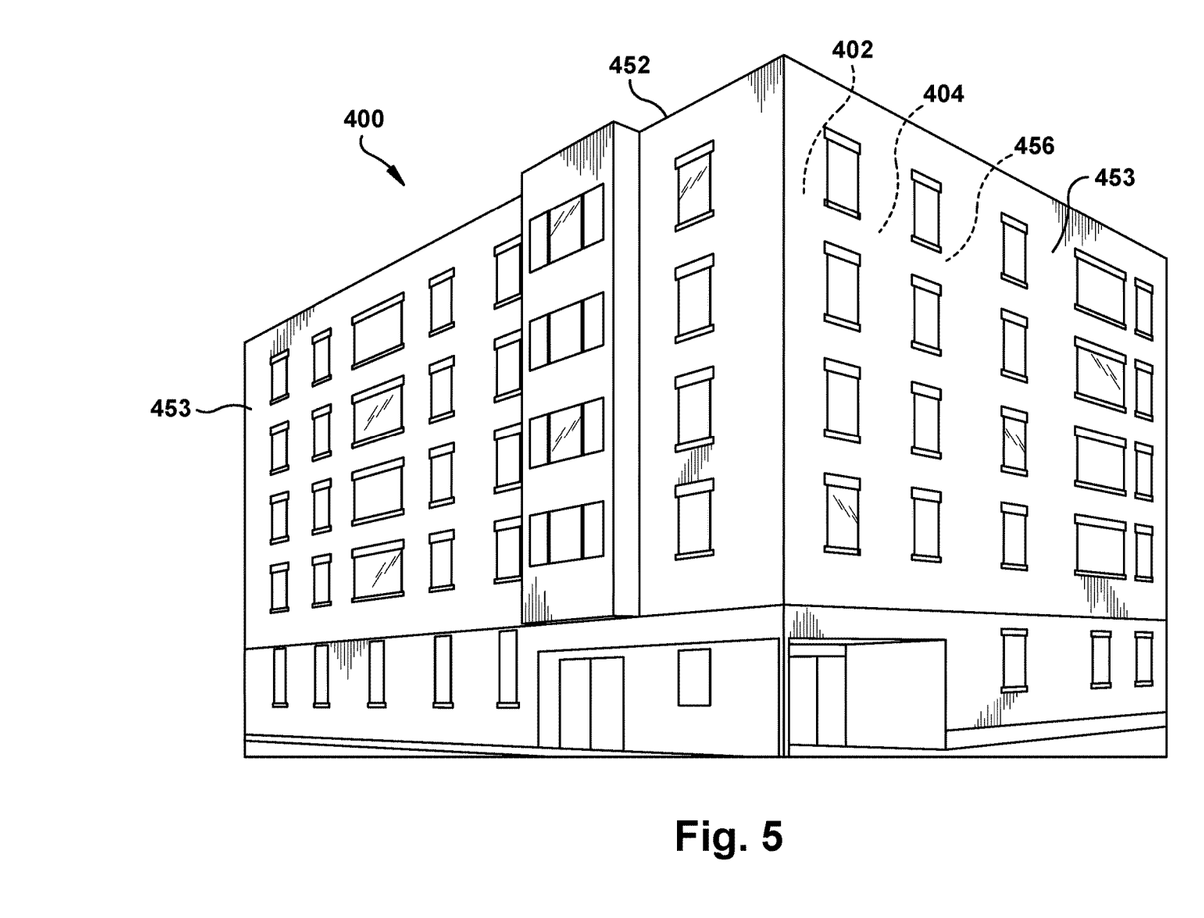
FIG. 5 is an illustration of another example of a multi-story building having insulation cavities between the ceiling of one story and the floor of the next story.

Referring to FIGS. 4 and 5, examples of multi-story buildings 400 having insulation cavities 456 between ceilings 402 of one story and floors 404 of the next story. The insulation cavities 456 between ceilings 402 of one story and floors 404 of the next story may contain electrical wiring, HVAC ductwork, gas lines, water supply conduits, and/or waste conduits. Providing fiberglass loosefill insulation material 222 in the cavities provides protection from the spread of fire in the cavities 456 between ceilings 402 of one story and floors 404 of the nextstory.

The buildings 400 may take a wide variety of different forms. In one exemplary embodiment, the buildings 400 are residential and/or commercial buildings having between two and five stories. However, the buildings 400 can have any configuration. For example, the buildings may have more than five stories, such as buildings that are between three and twenty, thirty, forty, fifty, one-hundred, or more stories tall. FIG. 4 illustrates an exemplary embodiment, where each floor may include one living space, such as an apartment. FIG. 5 illustrates an exemplary embodiment, where each floor may include multiple living spaces or apartments. In either case, insulation cavities 456 are defined between ceilings 402 of one story and floors 404 of the next story. The loosefill insulation installations of the present application are especially useful in three to five story buildings. As shown in FIG. 4, a standard installation machine 310 can deliver loosefill insulation 222 through a hose 346 to all of the insulation cavities 456 between ceilings 402 of one story and floors 404 of the next story, while the insulation machine 310 is on the ground floor 420. That is, the loosefill insulation 222 is light enough to be pneumatically transported to an insulation cavity 456 between the fourth and fifth stories with a standard loosefill blowing machine 310 positioned on the ground floor.

Figure 6:
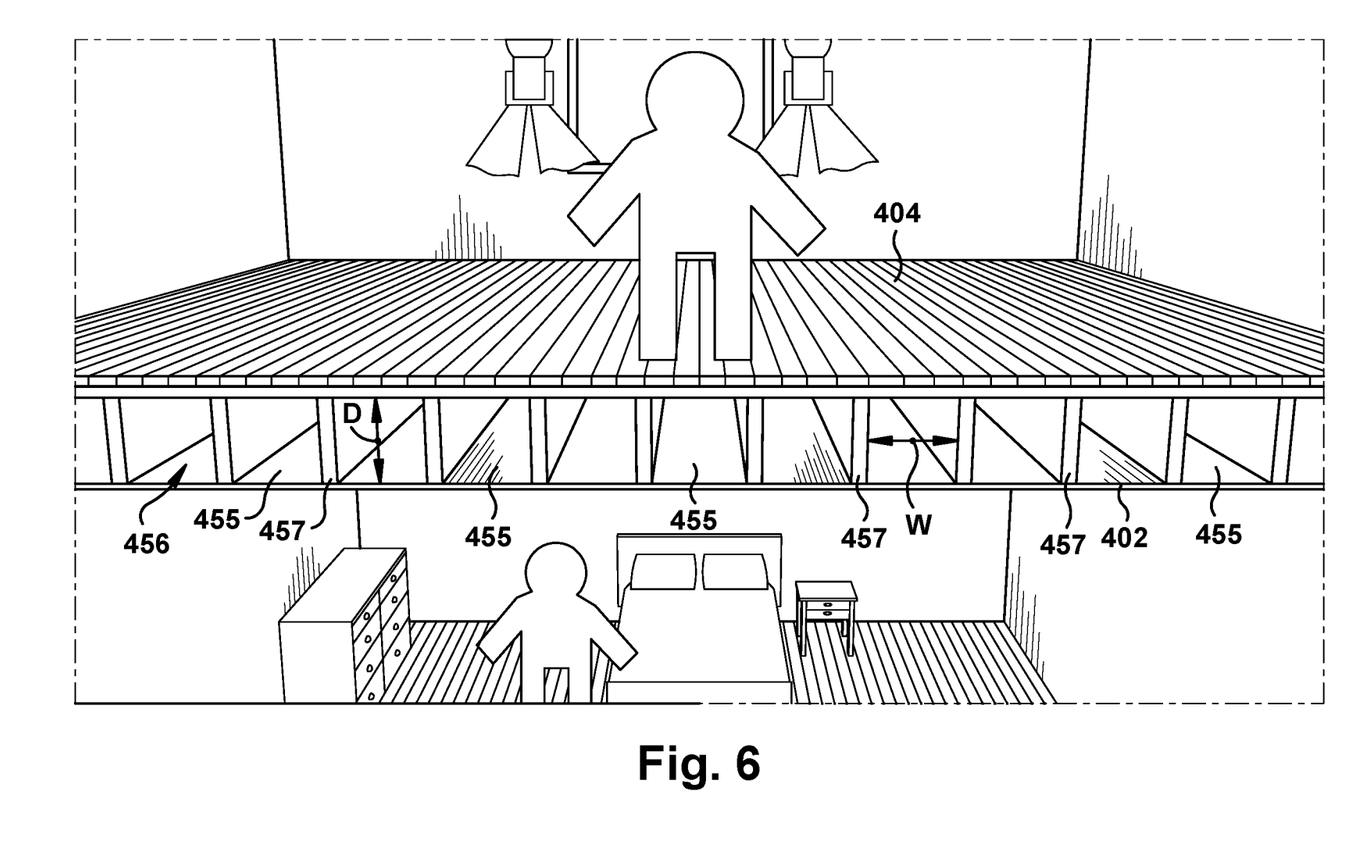
FIG. 6 is an illustration of an insulation cavity of a multi-story building between the ceiling of one story and the floor of the next story.
Figure 7:
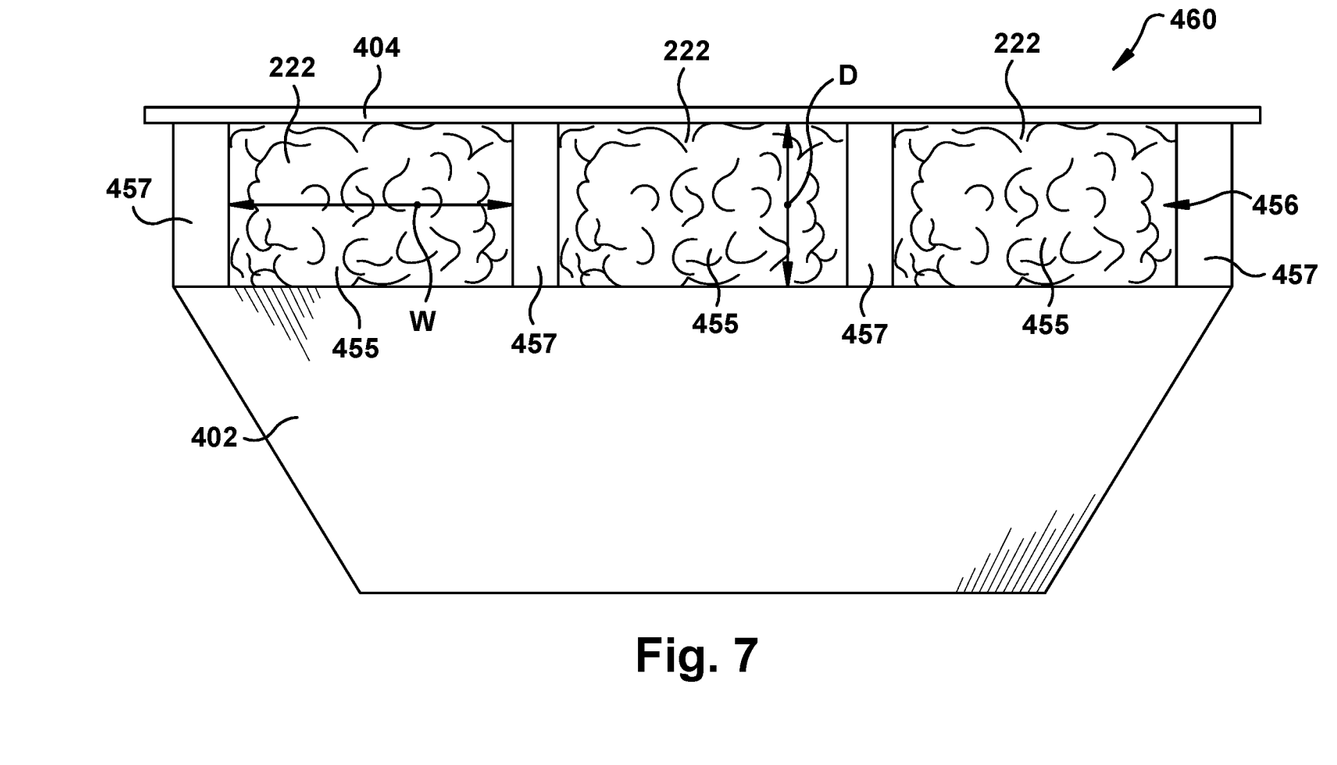
FIG. 7 is an illustration of an insulation cavity of a multi-story building between the ceiling of one story and the floor of the next story that is filled with insulation.

The building 450 includes a roof 452, exterior walls 453, internal ceilings 402, and floors 404. An insulation space 456 is formed between the internal ceilings 402 of one story and floor 404 of the next story. This insulation space 456 can take a wide variety of different forms. For example, the insulation space 456 can be divided by floor supports 457 into insulation cavities 455. The floor supports 457 can be spaced apart by a repeating width W between twelve inches and twenty-four inches apart, such as twelve inches apart, sixteen inches apart, twenty-four inches apart, or any other spacing between twelve inches and twenty-four inches. The insulation space 455 can have a depth D between six inches and seventy-two inches, such as between six an sixty inches, such as between six and thirty-six inches, such as between twelve inches and twenty-four inches, such as between sixteen and twenty inches, such as eighteen inches. The insulation cavities 456 can be filled with finely conditioned loosefill material 222 distributed by the loosefill blowing machine 310 through the distribution hose 346 to form a loosefill insulation installation 460 (See FIG. 7). The insulation cavities 455 can also be cavities between wall studs or any other area of a building needing to be insulated.

In one exemplary embodiment, an unbonded loosefill insulation material (ULF) 222 is formed to have relatively large, light nodules, such that when blown into a constrained space, the ULF resists compaction to high densities. For example, the ULF may have an average nodule Nodule Rating of approximately 2. The ULF with large, light, compaction resistant nodules reduces installation costs, as fewer pounds of ULF are needed to fill the same volume. The ULF with large, light, compaction resistant nodules can be pneumatically transported in a loosefill insulation hose vertically to the space below a residential fifth story floor and above the fourth story ceiling from the first story floor, without jamming the hose (see FIG. 4).

In one exemplary embodiment, the loosefill insulation material 222 with large, light, compaction resistant nodules is configured to provide a loosefill insulation installation having a high loft, low density, and/or a low thermal resistance R per inch. For example, the loosefill insulation material 222 may be configured to have large, light, compaction resistant nodules as compared to conventional loosefill insulation material. For example, due to the larger, compaction resistant nodules, the loosefill insulation material 222 may be configured to fill or substantially fill an insulation cavity 456 between the ceiling of one story and the floor of the next story having a depth of between sixteen and twenty inches with loosefill insulation material 222 at a density of less than one pound per cubic foot (pcf) and provide a thermal resistance of R 3.9 per inch or less, such as a thermal resistance of R 3.5 per inch or less. Due to the larger, compaction resistant, loosefill insulation material nodules, the loosefill insulation material 222 may be configured to fill or substantially fill an insulation cavity 456 between the ceiling of one story and the floor of the next story having a depth of between sixteen and twenty inches with loosefill insulation material 222 at a density of between 0.6 and 1.0 pcf and a thermal resistance between 3.1 and 3.9 R per inch, such as between 0.6 and 1.0 pcf and a thermal resistance between 3.3 and 3.9 R per inch, such as between 0.6 and 0.8 pcf and a thermal resistance between 3.3 and 3.5 R per inch. Due to the larger, compaction resistant, loosefill insulation material nodules, the loosefill insulation material 222 may be configured to fill or substantially fill an insulation cavity 456 between the ceiling of one story and the floor of the next story having a depth of eighteen inches with loosefill insulation material 222 at a density of between 0.6 and 1 pcf and a thermal resistance between 3.3 and 3.9 R per inch, such as between 0.6 and 0.8 pcf and a thermal resistance between 3.3 and 3.5 R per inch. In one exemplary embodiment, the loosefill insulation material 222 may be configured to fill or substantially fill an insulation cavity 456 between the ceiling of one story and the floor of the next story having a depth of eighteen inches with loosefill insulation material 222 at a density of 0.7 pcf and a thermal performance of 3.5 R per inch and when installed at a density of 1.0 pcf the corresponding thermal performance is 3.9 R per inch.

Figure 8:
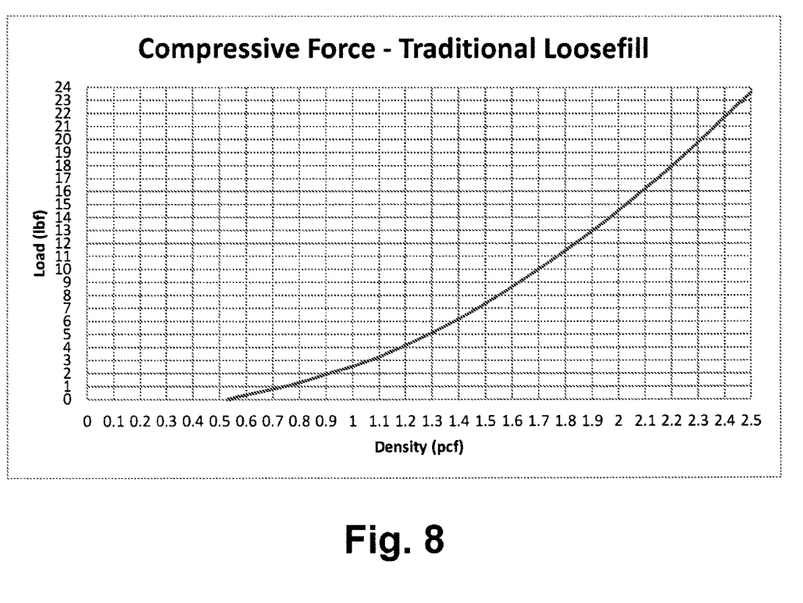
FIGS. 8-10 contain graphs that provide an illustration of the difference in compaction resistance of traditional loosefill insulation nodules compared to compaction resistance of inventive loosefill insulation nodules.
Figure 9:
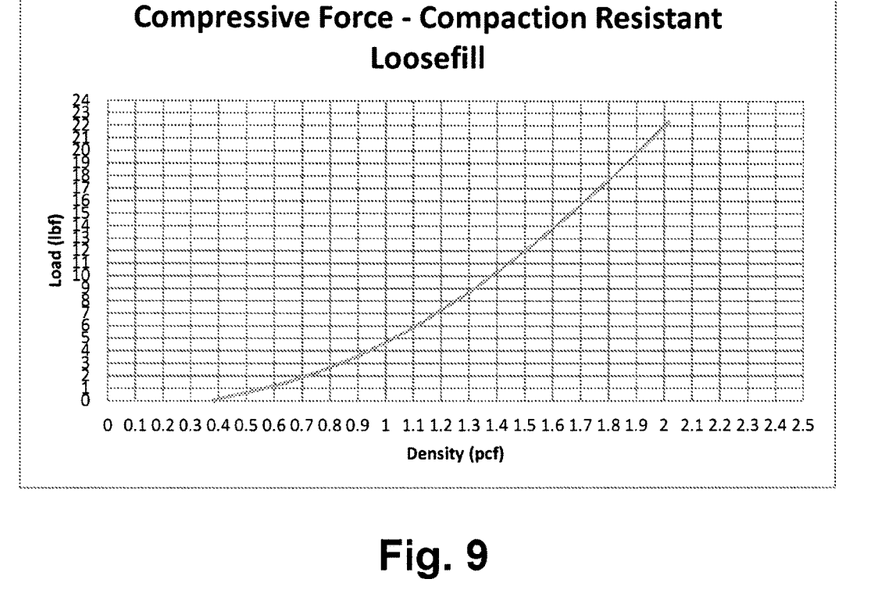
Figure 10:
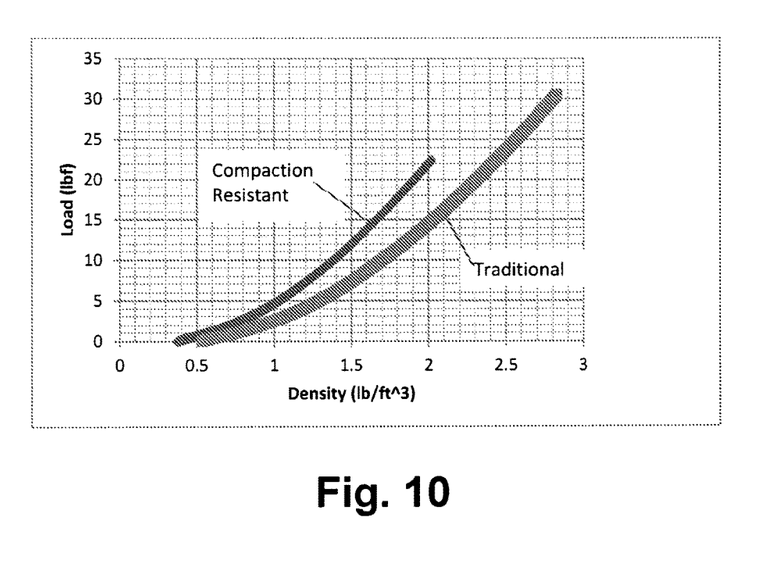

The graphs in FIGS. 8-10 provide an illustration of the difference in compaction resistance of traditional loosefill-insulation nodules compared to compaction resistant loosefill insulation nodules. In the example illustrated by the graphs in FIGS. 8-10, the units of the "Load" are pounds of force (lbf) applied to a 1.13 ft$^2$ surface area. For example, the loosefill insulation can be evenly distributed in a square or rectangular box having an open top. A square or rectangular panel that just fits in the open top of the square or rectangular box, without rubbing on the sides of the box, is placed in the open top of the box on top of the loosefill insulation. The square or rectangular panel has a 1.13 ft$^2$ surface area in the example illustrated by the graphs in FIGS. 8 and 9. In the graph in FIG. 8, loads ranging from 0-24 lbf are applied to the panel on top of the traditional loosefill and the corresponding density (pcf) of the loosefill insulation is measured and graphed. In the graph in FIG. 9, loads ranging from 0-24 lbf are applied to the panel on top of the compaction resistant loosefill and the corresponding density (pcf) of the loosefill insulation is measured and graphed. The graph in FIG. 10 combines the graphs in FIGS. 8 and 9 and illustrates that for all loads applied to the traditional and compaction resistant loosefill insulation materials, the density of the compaction resistant loosefill insulation material is lower than the density of the traditional loosefill insulation material. In the example illustrated by the graph in FIG. 10, the difference in density between the compaction resistant loosefill insulation material and the traditional loosefill insulation material increases as the load is increased. As such, the compaction resistant loosefill insulation material is more compaction resistant than traditional loosefill insulation material.

While the discussion above has been focused on larger loosefill insulation material nodules, lower loosefill installation density between the ceiling of one story and the floor of the next story, and a lower thermal resistance R, it should be appreciated that in other embodiments, not all of these parameters need to be adjusted and other parameters of the loosefill insulation material and/or the blowing machine can be changed.

The principle and methods of a loosefill insulation installation have been described in the above exemplary embodiments. However, it should be noted that the loosefill insulation installation may be practiced otherwise than as specifically illustrated and described without departing from its scope. For example, any combination or sub combination of the features of the loosefill insulation material, the loosefill insulation installation, and/or the methods for installing loosefill insulation can be combined and are contemplated by the present application.

The invention claimed is:

1. A loosefill insulation installation comprising:
    a building having a plurality of stories including a first story and a second story, the first story and the second story being adjacent to one another;
    an insulation space between a ceiling of the first story and a floor of the second story, wherein the insulation space has a depth between sixteen inches and twenty inches;
    loosefill insulation material made from fiberglass fibers that substantially fills the insulation space to form installed loosefill insulation material;
    wherein a thermal resistance (R) per inch of the installed loosefill insulation material is between 3.1 and 3.9 R per inch; and wherein an average density of the installed loosefill insulation material is between 0.6 and 1.0 pounds per cubic foot.

2. The loosefill insulation installation of claim 1 wherein the fiberglass fibers comprise a combination of two or more of $SiO_2$, $Al_2O_3$, CaO, MgO, $B_2O_3$, $Na_2O$, $K_2O$, and $Fe_2O_3$.

3. A loosefill insulation installation comprising:
a plurality of roof supports;
roof sheathing supported by the roof supports;
insulation support material below the roof supports and roof sheathing;
an insulation space between the roof sheathing and the insulation support material, wherein the insulation space has a depth between sixteen inches and twenty inches;
loosefill insulation material made from fiberglass fibers that substantially fills the insulation space to form installed loosefill insulation material;
wherein a thermal resistance (R) per inch of the installed loosefill insulation material is between 3.1 and 3.9 R per inch; and
wherein an average density of the installed loosefill insulation material is between 0.6 and 1.0 pounds per cubic foot.

4. The loosefill insulation installation of claim 3 wherein the fiberglass fibers comprise a combination of two or more of $SiO_2$, $Al_2O_3$, CaO, MgO, $B_2O_3$, $Na_2O$, $K_2O$, and $Fe_2O_3$.

5. A loosefill insulation installation comprising:
a constrained insulation space;
loosefill insulation material made from fiberglass fibers that substantially fills the constrained insulation space to form installed loosefill insulation material;
wherein a thermal resistance (R) per inch of the installed loosefill insulation material is between 3.1 and 3.9 R per inch; and
wherein an average density of the installed loosefill insulation material is between 0.6 and 1.0 pounds per cubic foot.

6. The loosefill insulation installation of claim 5 wherein the fiberglass fibers comprise a combination of two or more of $SiO_2$, $Al_2O_3$, CaO, MgO, $B_2O_3$, $Na_2O$, $K_2O$, and $Fe_2O_3$.

7. The loosefill insulation installation of claim 5 wherein the constrained insulation space comprises a space between a floor of a building and a ceiling of a building.

8. The loosefill insulation installation of claim 5 wherein the constrained insulation space comprises a space between an insulation support material and roof sheathing.

9. The loosefill insulation installation of claim 5 wherein the constrained insulation space comprises a space between an interior wall of a building and exterior sheathing of a building.

\* \* \* \* \*